Figure 1:
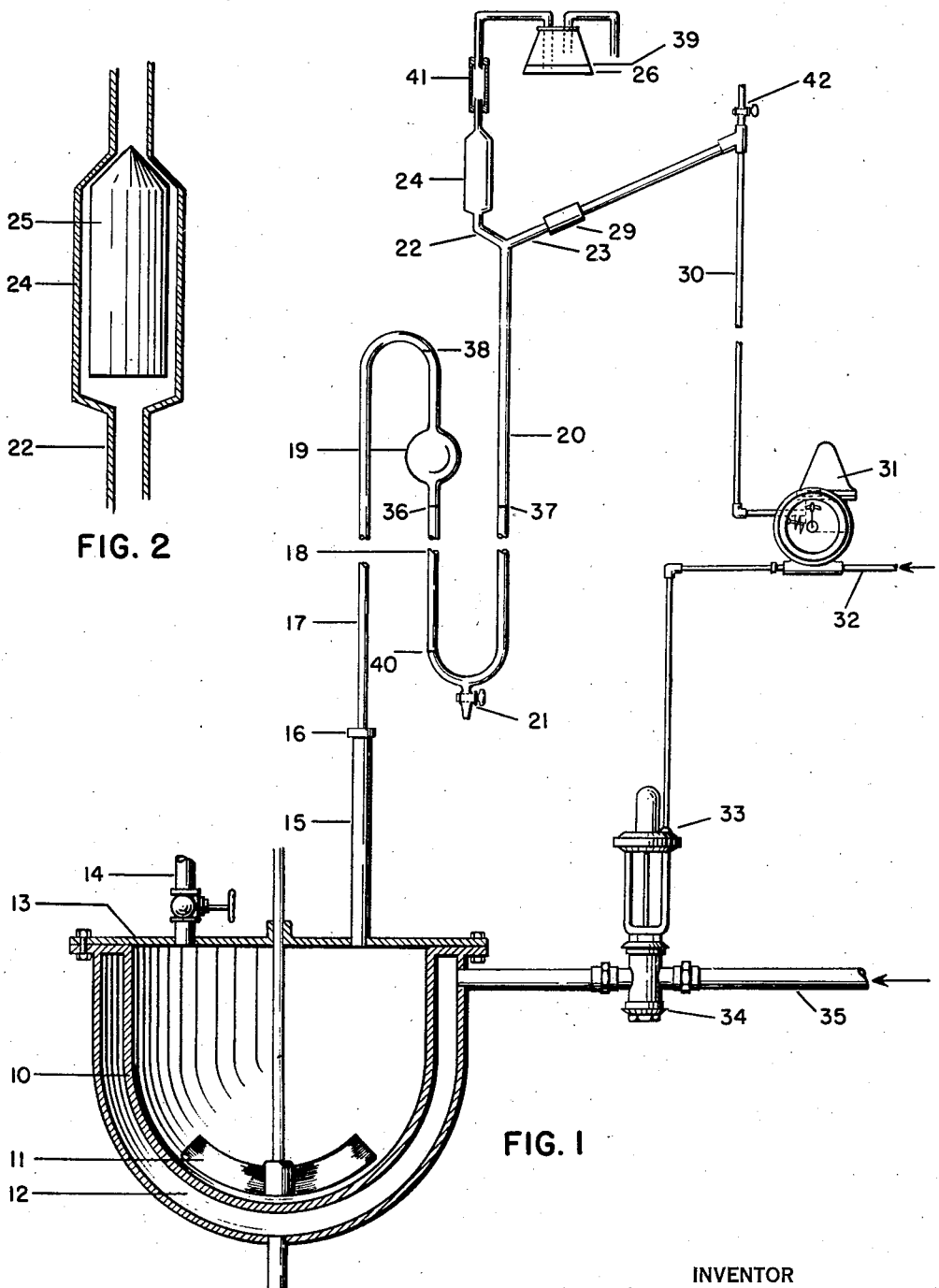

July 27, 1943.        B. M. MARKS        2,325,067

PROCESS AND APPARATUS FOR POLYMERIZATION

Filed Nov. 10, 1941

INVENTOR
BARNARD M. MARKS
BY
ATTORNEY

Patented July 27, 1943

2,325,067

UNITED STATES PATENT OFFICE 2,325,067

PROCESS AND APPARATUS FOR POLYMERIZATION

Barnard M. Marks, Newark, N. J., assignor to E. I. du Pont de Nemours & Company, Wilmington, Del., a corporation of Delaware Application November 10, 1941, Serial No. 418,512

2 Claims. (Cl. 23—290)

This invention relates to the polymerization of ethenoid monomers and, more particularly, to improvements in the process and apparatus for their polymerization in granular form.

The ethenoid monomers, of which the esters of acrylic and methacrylic acids, vinyl esters and styrene are important examples, are in most cases mobile liquids which as individuals, or in admixture with each other, or auxiliary ingredients are susceptible of polymerization to resinous solids under the influence of heat, light and catalysts.

A convenient procedure for the polymerization of such monomer on a commercial scale is that which is commonly designated "granular polymerization" and which comprises polymerization of the monomer while maintained in the form of droplets suspended in a non-solvent vehicle, ordinarily water.

A copending application of David A. Fletcher, Fred L. Johnston, and Maurice L. Macht, filed September 19, 1941, S. N. 411,488, describes the granular polymerization of methyl methacrylate and similar ethenoid monomers in an aqueous suspension at temperatures of 100° C. and above. In such a process, it is necessary to provide a closed reaction vessel in order to allow the temperature to rise to the desired level with a corresponding increase in pressure above atmospheric pressure.

In such a process of polymerization in a closed vessel at temperatures above the boiling point of the monomer and the vehicle, it is necessary to control the temperature developed by the exothermic reaction, since the temperature of the reaction affects the molecular weight of the polymer produced. By the use of a relatively high temperature with pressure above atmospheric pressure, a polymer of a given molecular weight can be produced with the use of a quantity of catalyst relatively small compared to that required if the process were conducted at atmospheric pressure.

By the use of a high ratio of liquid vehicle to monomer, it is possible to moderate the acceleration of the exothermic reaction somewhat, since the liquid vehicle which takes no part chemically in the reaction serves to absorb and dissipate some of the heat which is developed. However, to rely solely on this method of controlling the temperature increase would necessitate the provision of such a large ratio of vehicle to monomer that the productivity of a given piece of equipment would be extremely small. Accordingly, the provision of an effective external means of control of the temperature makes it feasible to operate with a relatively high ratio of monomer to vehicle.

Excessively rapid polymerization such as occurs if the temperature rises too high tends to cause an agglomeration of the granules of polymer which impairs the yield of acceptable product and adds difficulty to the subsequent processing of the product.

A further reason for controlling the temperature is that of safety, in that the unrestrained progress of the exothermic reaction within a closed vessel may cause the development of dangerous pressures.

The object of the present invention is to provide a sensitive and effective method of control of the polymerization of ethenoid monomers by the so-called granular method under superatmospheric pressure. A further object is to provide a process for the polymerization of ethenoid monomers at elevated temperatures and under superatmospheric pressure under such conditions that the molecular weight of the polymer produced may be controlled without the formation of agglomerations and without the development of unsafe pressures within the equipment. A further object is the provision of apparatus for carrying out such a polymerization. A further object is to provide means of adapting sensitive pressure actuated control instruments of small range to the control of a reaction which develops pressures considerably in excess of such range. Other objects will appear hereinafter.

Figure 2:
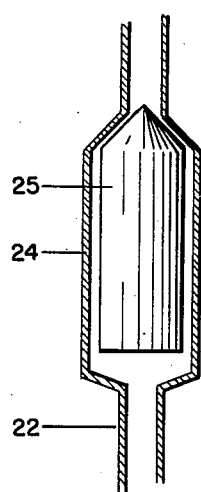

In accordance with this invention, these objects are accomplished by a process which comprises subjecting a water-suspension of methyl methacrylate or similar ethenoid resin containing the polymerization catalyst in a closed system to temperatures above 100° C. and by means of apparatus hereinafter described controlling the temperature of the reaction batch so that there will result a polymer having an average molecular weight above 12,000. The control of the temperature is effected by abstracting heat from the reaction batch for a period sufficient momentarily to terminate the acceleration of the rate of polymerization and to decelerate it slightly whenever during the progress of the polymerization the temperature of the batch reaches a designated value as evidenced by the pressure in the reaction vessel. The apparatus used in carrying out the process of this invention comprises a jacketed reaction vessel provided with a stirrer, a pressure actuated means for controlling the flow of water through the jacket, a mercury manometer having one arm in communication with the vessel, a branch connected to and extended forwardly from the second arm of the manometer and communicating with the atmosphere, a valve in this branch which is closed by the rise of mercury, and a second branch tube containing water or other inert liquid and constituting a connection between the second arm of the manometer and the pressure actuated means of control. Equipment constituting a preferred embodiment of the present invention is shown in the drawing to which reference will be made in the detailed description of the invention. Fig. 1 is a diagrammatic view of the equipment as a whole. Fig. 2 shows in greater detail valve 24 of Fig. 1.

Referring to the drawing, the reaction of polymerization is conducted in a reaction kettle 10 (Fig. 1), equipped with an agitator 11, a water jacket 12 and a gas-tight cover 13. Through the cover 13 pass, in addition to the shaft of the agitator 11, a valved loading port 14, and a vapor line 15 which communicates with the space above the charge in the kettle 10. The upper end of the vapor line 15 is connected through a coupling 16 to the vertical column 17 of a continuous structure of tubes and bulbs, conveniently of glass, comprising also other parts presently to be described.

A second vertical column 18 contains in its upper portion an enlargement or bulb 19. A third vertical column 20 forms in conjunction with the vertical column 18 a U-tube, at the bottom of which is a valved vent 21. At its upper end, the vertical column 20 leads into two branches 22 and 23.

The branch 22 contains an enlarged portion or float chamber 24, inside of which is a (solid) glass float 25, shown in greater detail in Fig. 2. The upper surface of the float 25 and the inner surface of the upper portion of the chamber 24 are ground into conformity with each other so that raising of the float 25 will seal the top of the float chamber 24. Thus the chamber and float constitute a valve which will be closed by raising of the float.

The branch 22 continuing above the float chamber communicates with a reservoir 26, shown as an Erlenmeyer flask closed with a stopper fitted with an inverted U-tube to give it communication with the atmosphere while minimizing entrance of dust.

The branch 23 leads through a coupling 29 to a tube or pipe 30 which communicates with the high-pressure side of a bell-type differential pressure controller 31.

When the pressure transmitted through the line 30 reaches a predetermined value, as presently to be described, the controller 31 functions in conventional manner to open a valve in an air supply line 32, and the air actuates a diaphragm motor 33 which, in turn, operates the controlling valve 34, on the cold water line 35 so as to admit cold water to the jacket 12 of the kettle 10. This chilling influence retards the rate of the reaction of polymerization within the kettle 10. The pressure within the kettle 10 is accordingly reduced, the controller 31 ceases to actuate the diaphragm motor 33 and the upply of cold water is cut off again.

In the U-tube formed by vertical columns 18 and 20 is placed a quantity of mercury sufficient so that when most of it is displaced into the column 20 and the branch 22 its weight will balance nearly all of the maximum pressure to be developed by the reaction in the kettle 10. Above the mercury in the column 18 is a quantity of water, and water also fills the column 20, above the mercury, the branch 22, up into the reservoir 26, and also the branch 23 and 30 all the way to the controller 31.

When the whole system is under atmospheric pressure, the levels of mercury in the columns 18 and 20 at 36 and 37 are substantially the same, differing only by enough to compensate for the small difference in pressure resulting from the difference in the heights of the water in the two columns, the level of water in column 18 being conveniently at 38, above the bulb 19, and that in the column 20 being at 39 in the reservoir 26 which constitutes an extension of the column 20. Also, when the whole system is under atmospheric pressure the pressure upon the high-pressure side of the controller 31 is in excess of atmospheric by only the head of water between its level and the level at 39. The glass float 25, being heavier than water, is in its lowest position, resting upon the bottom of the float chamber 24 but not sealing it.

When the reaction of polymerization in the closed kettle develops pressure within the kettle, the level of the mercury is pushed down in the column 18 and up in the column 20. The level of water in the column 18 falls correspondingly, but the dimensions of the enlarged portion 19 are sufficient to hold enough water so that the level of the water does not fall below this enlarged portion. The purpose of having water here is to prevent fouling of the mercury by polymer formed from monomer condensed from vapor rising from the kettle 10. This water is a convenient accessory, but not an essential feature of the invention.

The rise in the level of mercury in column 20 displaces water above it only through branch 22 into the reservoir 26, since branch 23, 30 leading to the controller 31 is already full of water and can hold no more. As the development of pressure in the kettle 10 pushes the level of the mercury in the column 20 up toward the intersection of branches 22 and 23, there is no increase in the pressure transmitted to the controller 31 through the branch 23, 30 except that due to the very small increase in the level of water in the reservoir above the initial level 39. Thus, if the column of mercury in the system is long enough, a considerable pressure in the kettle 10 is balanced by the weight of the mercury and is not transmitted to the controller 31.

The weight of the mercury balances an increasing pressure in the kettle 10 until the latter becomes great enough to force the upper level of the mercury into the float chamber 24. The mercury will obviously not enter the branch 23 because this branch is already full of water and because it is tilted upward from the intersection. When the mercury enters the float chamber 24, it buoys up the glass float 25 which seats against the ground upper surface of the float chamber 24, and prevents further rise in the branch 22.

At this moment, the actual pressure upon the high-pressure side of the controller 31 is still very small and the instrument 31 is desirably adjusted to read zero at this moment. The pressure above atmospheric in the kettle 10 is just balanced by the head of mercury between an upper level in the float chamber 24 and a lower level 40 in the lower part of the column 18 (neglecting the minor influence of the pressures due to heads of water). It will be evident that the amount of pressure in the kettle thus to be balanced by the head of mercury may be predetermined by proper dimensioning of the equipment and by providing an appropriate amount of mercury.

If, for example, it is desired that the mercury shall balance a pressure of 25 pounds per square inch above atmospheric in the kettle, then the vertical distance between the upper level of the mercury in the float chamber 24 and the lower level 40 of the mercury in the column 18 must be approximately 52 inches. Thus the vertical distance from the float chamber to the bottom of the U-tube formed by the columns 18 and 20 will be made slightly in excess of 52 inches, and then sufficient mercury will be supplied to provide the necessary difference in level of 52 inches. The amount of mercury in the system can be adjusted by making additions through the line 22, after breaking it at a connection 41, or by drawing off through the valved outlet 21.

In order to accommodate the mercury also when the instrument is under atmospheric pressure, the vertical height of the column 18, below the enlarged portion 19, must be sufficiently great to hold half of the mercury.

When the further progress of the reaction develops pressure in excess of that thus balanced by the mercury, there can be no further rise in the level of mercury in the branch 22 because the valve 24, 25 is now closed. Accordingly, the excess of pressure is transmitted to the controller 31 which, having been set to be actuated by a small pressure, is actuated thereby to effect delivery of cold water to the jacket of the reaction vessel.

The following further details of construction and assembly of the equipment are to be noted.

The columns 17, 18 and 20, the branches 22 and 23 and the enlargements 19 and 24 are desirably made of glass to form a continuous structure, without joints. The junction between the column 17 and the vapor line 15, which latter will normally be of metal, will be subjected to the full pressure developed within the reaction kettle 10 and must be constructed to withstand that pressure.

The line composed of the parts 23 and 30 slopes upward from the intersection with column 20 and branch 22, both in order to prevent the entrance of mercury, which otherwise would tend by its weight to displace water, and also to ensure the escape of air when the system is being filled with water. For this latter purpose the line 30, at its highest point, is provided with a valved vent 42.

It is essential that the level of water in the branch 22 be at least as high as the highest point of the branch 23, 30 in order to ensure that the latter remain full at all times. This is the only function of the reservoir 26, and of the water in it and in the branch 22. This water does not participate in the functioning of the equipment, and can be omitted if other provision be made for the essential feature of keeping the branch 23, 30 full of water at all times. Such provision may take the form of a flexible diaphragm in the branch 23 at or near its intersection with column 20; such a diaphragm will prevent loss of water from branch 23, 30 and will transmit the small pressure by which the controller 31 is actuated.

In Fig. 2 the float chamber 24 and float 25, which constitute a one-way valve in the line 22, are shown. The mercury rising from below buoys the float 25 to the top of the chamber 24, where the matching ground surfaces make a complete seal.

Obviously, this valve may be of other operative form. That shown is merely convenient and easily made. For a valve of this form, the float 25 must, of course, have an effective specific gravity below that of mercury and above that of the water or other inert fluid in the system.

The pressures used in the polymerization in the apparatus described will normally be between 15 and 70 pounds per square inch.

The following example illustrates the invention in a preferred embodiment in which the control is effected by automatic equipment.

*Example*

The following components constitute the reaction batch for a 100-gallon reaction kettle:

| | |
|---|---:|
| Methyl methacrylate monomer _____kilograms__ | 96 |
| Water _____do____ | 125 |
| Benzoyl peroxide_____grams__ | 240 |
| 1 per cent solution of partially neutralized polymethacrylic acid in water_____do____ | 800 |
| Na$_2$HPO$_4$.12H$_2$O _____do____ | 2500 |
| Diethyl phthalate_____kilograms__ | 2 |

The polymethacrylic acid (dispersing agent) and the dibasic sodium phosphate (buffer) are dissolved in the water to form the aqueous vehicle. The diethyl phthalate (plasticizer) is dissolved in the monomeric methyl methacrylate, and the benzoyl peroxide (catalyst) is introduced in the form of a filtered solution in a small portion of the monomer. All of the ingredients are introduced into the kettle through the loading port, which is then closed.

At this time, the whole system is under atmospheric pressure, and the mercury stands at approximately the same level in the two arms of the U-tube.

The contents of the kettle are heated as rapidly as possible by a generous circulation of low-pressure steam through a jacket of the kettle. When the temperature of the contents of the kettle has reached about 95° C., the circulation of steam is discontinued, since the reaction of polymerization has by this time been fully initiated and will carry itself along at an accelerating rate by reason of its exothermic nature, until such time as it will subsequently be checked by chilling.

The reaction of polymerization proceeds thus at an accelerating rate during the next twenty to thirty minutes. The temperature within the reaction kettle rises to about 125° C. and the pressure to about 50 pounds per square inch before the mechanism of the invention, having been set to transmit to the controller the excess of pressure over 50 pounds per square inch, goes into action to introduce cold water into the jacket of the kettle.

After the cold water begins to enter the kettle, the pressure and temperature within the kettle continue to rise, but less rapidly, until at the end of about 20 seconds the chilling effect of the cold water has so checked the progress of the reaction that the temperature and pressure within the kettle cease to rise and begin to fall.

As soon as the pressure has fallen again below the predesignated value of 50 pounds per square inch, the controller acts to shut off the supply of cold water. Then the reaction begins to gain speed again, the pressure once more rises above the predesignated value, and again the device is thereby actuated to effect an introduction of cold water into the jacket.

This cycle of checking the reaction and then allowing it again to accelerate repeats itself several times over a period of five to ten minutes, at the end of which time the polymerization is complete, or at least so nearly so that the pressure will not again build up to the level at which the device is actuated.

Cold water is now turned into the jacket by manual control independent of the device of the invention, so as to cool the contents of the kettle to a temperature at which they may be removed for further processing.

No agglomerations are formed during the polymerization and the molecular weight of the polymer is about 20,000.

The molecular weights referred to in the specification are estimated by the method of Staudinger (1933 Ann., 502-201).

It has been found desirable that the polymerization be conducted under conditions such that the mass temperature employed is that which will result in a polymer of an average molecular weight of not less than about 12,000. When this condition is satisfied, agglomeration of the polymer and development of pressures of unsafe magnitude are not encountered. The selection of the specific temperature to be used in the process for a specific batch will be made upon the basis of the molecular weight desired.

The invention provides a method of control of the exothermic reaction of polymerization of an ethenoid monomer and thus provides for the control of the molecular weight and other characteristics of the polymer produced. In spite of the fact that the reaction may develop pressures of the order of several atmospheres, the equipment of the invention utilizes a sensitive control instrument having a range of capacity of only a few pounds per square inch. This is accomplished by providing for the transmittal to a pressure actuated control instrument of a pressure which is not the full pressure developed by the process in the reaction vessel but which is merely the amount of that pressure which is in excess of a pre-selected magnitude.

As many apparently widely different embodiments of this invention may be made without departing from the spirit and scope thereof, it is to be understood that the invention is not limited to the specific embodiments thereof except as defined in the appended claims.

I claim:

1. An apparatus for the polymerization of an ethenoid monomer in suspension in an aqueous vehicle comprising a closed reaction vessel, a jacket upon said vessel, pressure actuated means for controlling the flow of cooling fluid through said jacket, a mercury manometer, a tube connecting said vessel with the first arm of the said manometer, a branch tube connected to and extending upwardly from the second arm of said manometer and communicating with the atmosphere, a valve located in said branch adapted to be closed by rise of mercury in said branch, a second branch tube communicating with the said pressure actuated means and a liquid filling said second branch.

2. An apparatus for the polymerization under pressure of an ethenoid monomer in suspension in an aqueous vehicle comprising a closed reaction vessel, a water jacket upon said vessel, a diaphragm motor controlling the flow of water through said water jacket, a pressure actuated controller for said diaphragm motor, a mercury manometer, a tube connecting said vessel with one arm of said manometer, a reservoir open to the atmosphere above the second arm of said manometer and connected thereto by a branch tube, a valve located in said branch tube adapted to be closed by rise of mercury in said branch, a second branch tube connecting said second arm of said manometer and with said pressure actuated controller, and a liquid filling said branches.

BARNARD M. MARKS.